US012381380B2

(12) United States Patent
Mathison et al.

(10) Patent No.: US 12,381,380 B2
(45) Date of Patent: Aug. 5, 2025

(54) WALL PLATE ASSEMBLY

(71) Applicant: LIBERTY HARDWARE MFG. CORP., Winston-Salem, NC (US)

(72) Inventors: Jeffrey John Mathison, Chicago, IL (US); James Leroy Daniels, Stokesdale, NC (US); Margaret Rider, Winston-Salem, NC (US); Sondie Blackmon, Winston-Salem, NC (US); Jack Michka, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 192 days.

(21) Appl. No.: 17/895,243

(22) Filed: Aug. 25, 2022

(65) Prior Publication Data

US 2023/0065728 A1 Mar. 2, 2023

Related U.S. Application Data

(60) Provisional application No. 63/237,106, filed on Aug. 25, 2021.

(51) Int. Cl.
*H02G 3/08* (2006.01)
(52) U.S. Cl.
CPC .................... *H02G 3/081* (2013.01)

(58) Field of Classification Search
None
See application file for complete search history.

(56) References Cited

U.S. PATENT DOCUMENTS

| | | | | |
|---|---|---|---|---|
| 1,717,871 A * | 6/1929 | Both | ........................ | H02G 3/14 220/241 |
| 4,972,045 A | 11/1990 | Primeau | | |
| 6,005,189 A | 12/1999 | Anker | | |
| 7,939,756 B2 * | 5/2011 | Daniels | ..................... | H02G 3/14 174/67 |
| 2010/0051312 A1* | 3/2010 | Daniels | ..................... | H02G 3/14 220/241 |
| 2011/0259635 A1* | 10/2011 | Alderson | ................. | H02G 3/12 174/480 |

\* cited by examiner

*Primary Examiner* — Krystal Robinson
(74) *Attorney, Agent, or Firm* — Brooks Kushman P.C.; Lora Graentzdoerffer

(57) ABSTRACT

A wall plate assembly is provided with a first wall plate portion to at least partially cover an electrical device, with a first lateral side with a first fastener and a second fastener formed partially along the first lateral side. A second wall plate portion to at least partially cover the electrical device, with a first lateral side with a first fastener formed partially along the first lateral side and sized to fasten in a length direction with the first wall plate portion second fastener, and a second fastener formed partially along the first lateral side and sized to fasten in the length direction with the first wall plate portion first fastener.

22 Claims, 9 Drawing Sheets

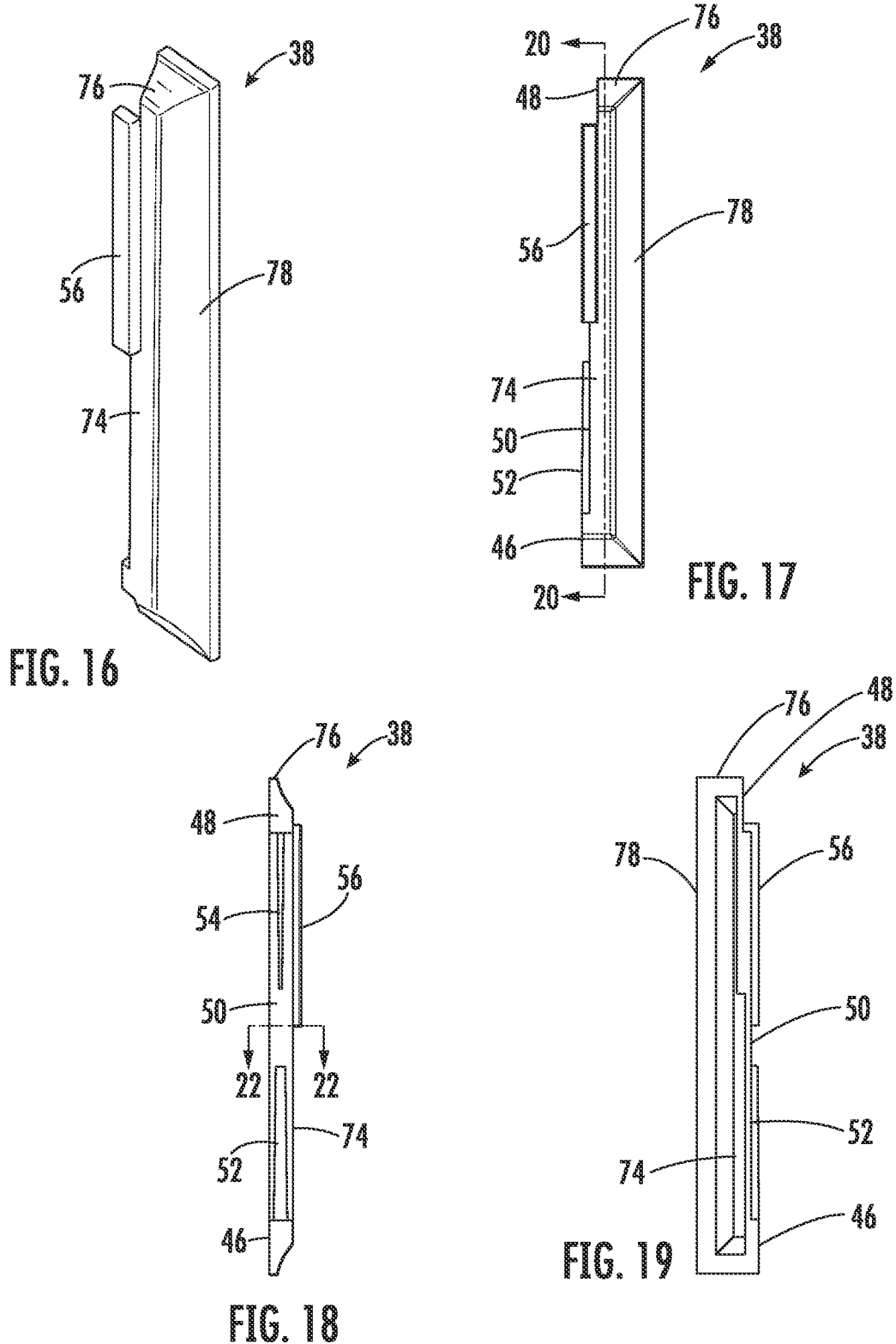

WALL PLATE ASSEMBLY

CROSS-REFERENCE TO RELATED APPLICATIONS

This application claims the benefit of U.S. provisional application Ser. No. 63/237,106 filed Aug. 25, 2021, the disclosure of which is hereby incorporated in its entirety by reference herein.

TECHNICAL FIELD

Various embodiments relate to wall plate assemblies for electrical devices.

BACKGROUND

A cover plate for a wall mounted electrical device is disclosed in Daniels et al. U.S. Pat. No. 7,939,756 B2, which issued on May 10, 2011, to Liberty Hardware Mfg. Corp.

SUMMARY

According to an embodiment, a wall plate assembly is provided with a first wall plate portion to at least partially cover an electrical device, with a first lateral side with a first fastener and a second fastener formed partially along the first lateral side. A second wall plate portion to at least partially cover the electrical device, with a first lateral side with a first fastener formed partially along the first lateral side and sized to fasten in a length direction with the first wall plate portion second fastener, and a second fastener formed partially along the first lateral side and sized to fasten in the length direction with the first wall plate portion first fastener.

According to a further embodiment, the first wall plate portion and the second wall plate portion have a common width in a lateral direction.

According to another further embodiment, the first wall plate portion and the second wall plate portion are each further provided with a substrate with a pair of lateral sides. The pair of lateral sides further define the first lateral side and a second lateral side.

According to an even further embodiment, the second lateral side of each substrate is further provided with a first fastener and a second fastener formed partially along the second lateral side.

According to another even further embodiment, the first fastener of the second lateral side of each substrate is sized to fasten in a length direction with the second fastener of first lateral side of each substrate.

According to yet another even further embodiment, the first fastener is a tapered projection or a tapered groove. The second fastener is the other of the tapered projection or the tapered groove.

According to another further embodiment, an end plate portion is provided with a first fastener and a second fastener to attach to the first lateral side or the second lateral side of each substrate.

According to an even further embodiment, the end plate portion is interchangeable to be installed to the first wall plate portion or the second wall plate portion in either upright direction to be installed to either lateral side of the first and second wall plate portions.

According to another further embodiment, each wall plate portion is further provided with a pair of rims, each extending along longitudinal edges of the substrate and away from the substrate to engage an upright support surface and to provide a decorative transition from the substrate to the upright support surface. The end plate portion is further provided with an outboard rim extending a length of the substrate to interconnect the pair of rims of an adjacent wall plate portion.

According to another further embodiment, each wall plate portion is further provided with a pair of rims, each extending along longitudinal edges of the substrate and away from the substrate to engage an upright support surface and to provide a decorative transition from the substrate to the upright support surface.

According to an even further embodiment, the pair of rims each have a width that is common with a width of the substrate. The pair of rims are each offset laterally from the substrate in opposed directions to provide an overhang from the substrate at one end of each lateral side and to provide a recess at another end of each lateral side.

According to another even further embodiment, the rim overhang provides a limit to translation of the first wall plate portion relative to the second wall plate portion.

According to another further embodiment, at least one of the first wall plate portion and the second wall plate portion is radially symmetrical about an axis perpendicular to the substrate with an increment of 180 degrees so that the at least one wall plate portion is interchangeable to be installed in either upright direction.

According to another further embodiment, a first seam cover extends partially over the first lateral side of the first wall plate portion. A second seam cover extends partially over the first lateral side of the second wall plate portion such that when the first wall plate portion is fastened to the second wall plate portion, the first seam cover and the second seam cover collectively cover a seam between the first lateral side of the first wall plate portion and the first lateral side of the second wall plate portion.

According to an even further embodiment, each seam cover extends along one half of a length of each wall plate portion to abut against a corresponding seam cover of an adjacent wall plate portion.

According to another further embodiment, the first wall plate portion and the second wall plate portion are each further provided with a substrate with a pair of lateral sides. The pair of lateral sides further defines the first lateral side and a second lateral side. A pair of rims, each extend along longitudinal edges of the substrate and away from the substrate to engage an upright support surface and to provide a decorative transition from the substrate to the upright support surface. A cross member extends across an intersection of the substrate and each rim to interconnect the first and second seam covers and provide a unitary ornamental appearance across the wall plate assembly.

According to another embodiment, a wall plate assembly is provided with a first wall plate portion to at least partially cover an electrical device, with a first lateral side with a first fastener formed therealong, and a first seam cover extending partially over the first lateral side. A second wall plate portion at least partially covers another electric device, with a first lateral side with a first fastener formed therealong and sized to fasten with the first fastener of the first wall plate portion, and a second seam cover extending partially over the first lateral side such that when the first wall plate portion is fastened to the second wall plate portion, the first seam cover and the second seam cover collectively cover a seam between the first lateral side of the first wall plate portion and the first lateral side of the second wall plate portion.

According to a further embodiment, a second fastener is formed along the first lateral side of the first wall plate portion. A second fastener is formed along the first lateral side of the second wall plate portion, sized to fasten with the second fastener of the first wall plate portion.

According to another embodiment, a wall plate assembly is provided with a first wall plate portion to at least partially cover an electrical device, with a substrate with a first lateral side with a first fastener and a second fastener formed partially along the first lateral side. A first end plate portion is provided with a first fastener sized to fasten in a length direction with the second fastener of the first wall plate portion, and a second fastener sized to fasten in the length direction with the first fastener of the first wall plate portion.

According to a further embodiment, the substrate defines a second lateral side. The second lateral side of the substrate is further provided with a first fastener and a second fastener formed partially along the second lateral side. A second end plate portion is provided with a first fastener sized to fasten in a length direction with the second fastener of the second lateral side of the first wall plate portion, and a second fastener sized to fasten in the length direction with the first fastener of the second lateral side of the first wall plate portion.

BRIEF DESCRIPTION OF THE DRAWINGS

FIG. 16 is a front perspective view of a wall plate portion according to another embodiment;

FIG. 17 is a front elevation view of the wall plate portion of FIG. 16;

FIG. 18 is a left side elevation view of the wall plate portion of FIG. 16;

FIG. 19 is a rear elevation view of the wall plate portion of FIG. 16;

DETAILED DESCRIPTION

Figure 1:
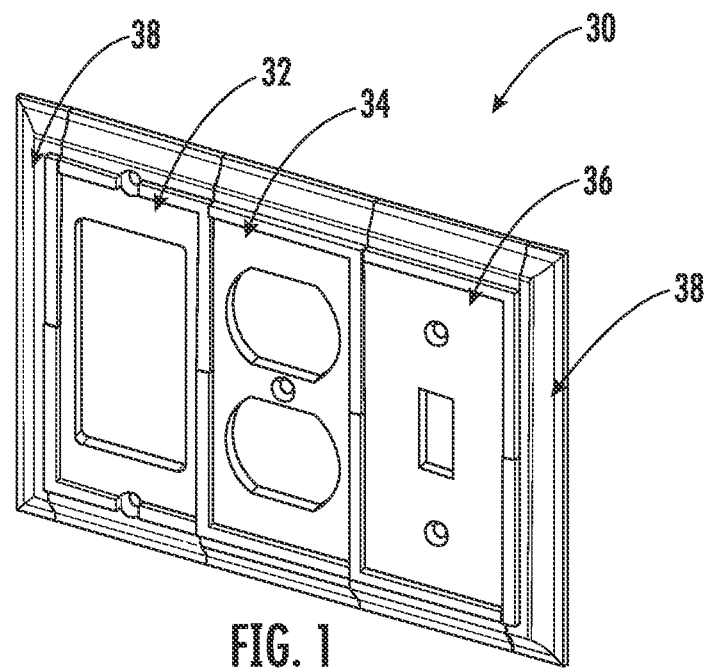
FIG. 1 is a front perspective view of a wall plate assembly according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1-5 illustrate a wall plate assembly 30 according to an embodiment. The wall plate assembly 30 is designed to cover a wall mounted electrical device, such as a light switch, an electrical outlet, a dimmer switch, a fan switch, communication port, or the like. The electrical devices are often mounted in an electrical box within a wall. The combination, arrangement and order of the electrical devices is often limited by the available openings and patterns of wall plates. The wall plate assembly 30 is modular, configurable, interchangeable, expandable, and customizable so that an end user may combine, arrange, and order the wall plate assembly 30 for any quantity of electrical devices.

The wall plate assembly 30 includes a plurality of interchangeable wall plate portions 32, 34, 36. For example, the wall plate portion 32 is a rocker wall plate portion 32 sized to receive a rocker switch, a slider switch, a rectangular outlet, or the like. By way of another example, the wall plate portion 34 is an outlet wall plate portion 34 for a duplex outlet. As another example, the wall plate portion 36 is a toggle wall plate portion for a toggle switch. Although the three wall plate portions 32, 34, 36, are illustrated, any combination, and arrangement of wall plate portions 32, 34, 36 can be employed in the wall plate assembly 30.

Figure 4:
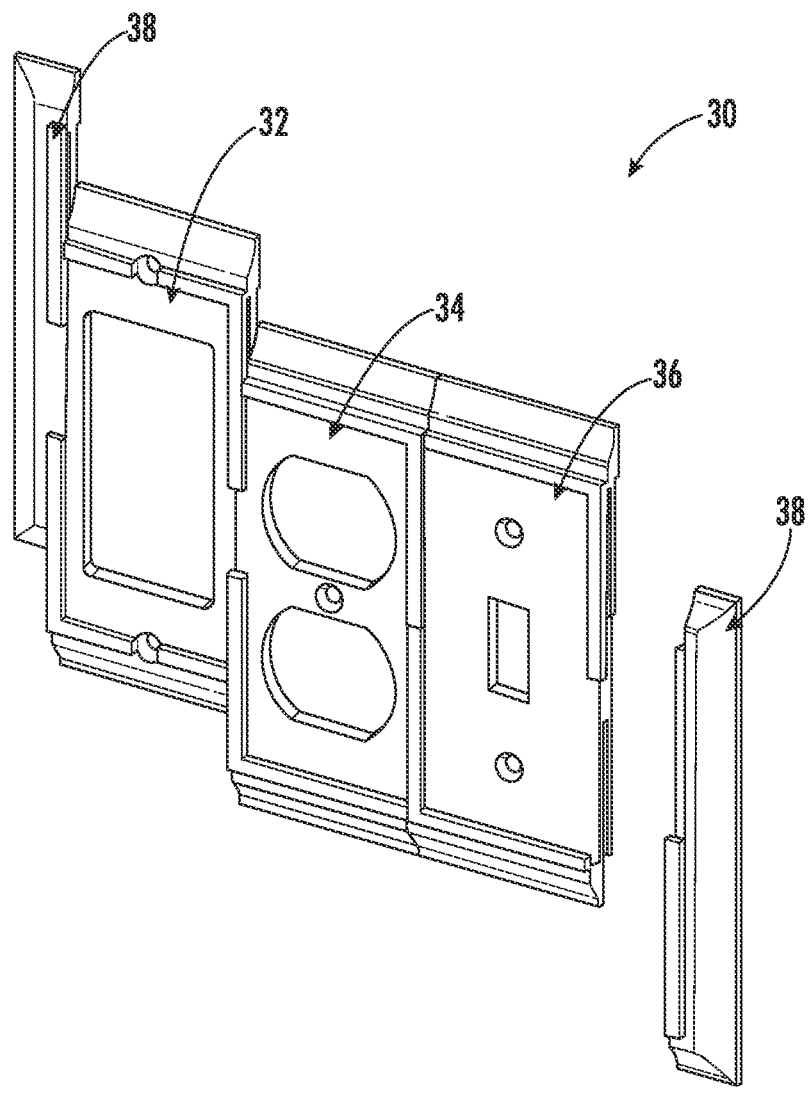
FIG. 4 is an exploded front perspective view of the wall plate assembly of FIG. 1.
Figure 5:
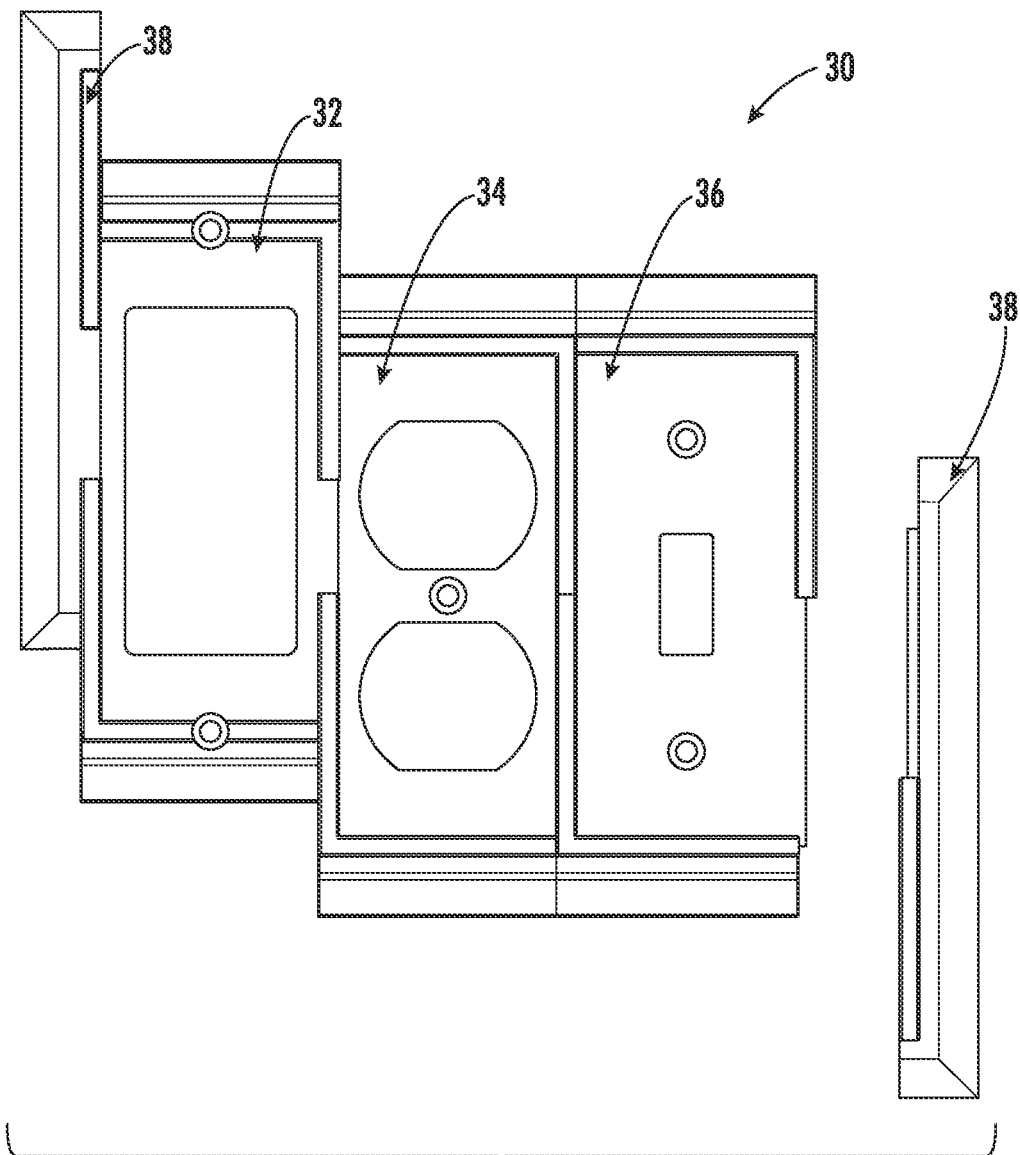
FIG. 5 is an exploded front elevation view of the wall plate assembly of FIG. 1.
Figure 6:
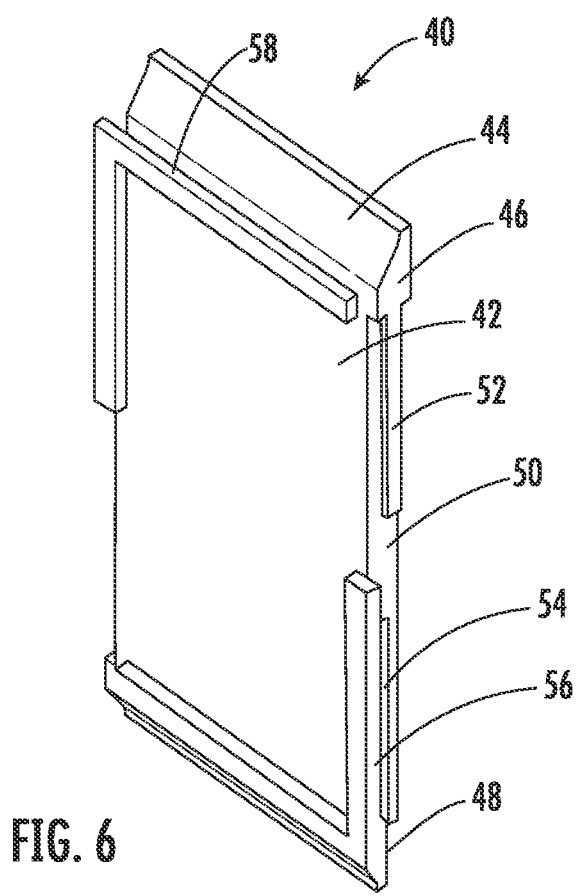
FIG. 6 is a front perspective view of a wall plate portion according to an embodiment.
Figure 7:
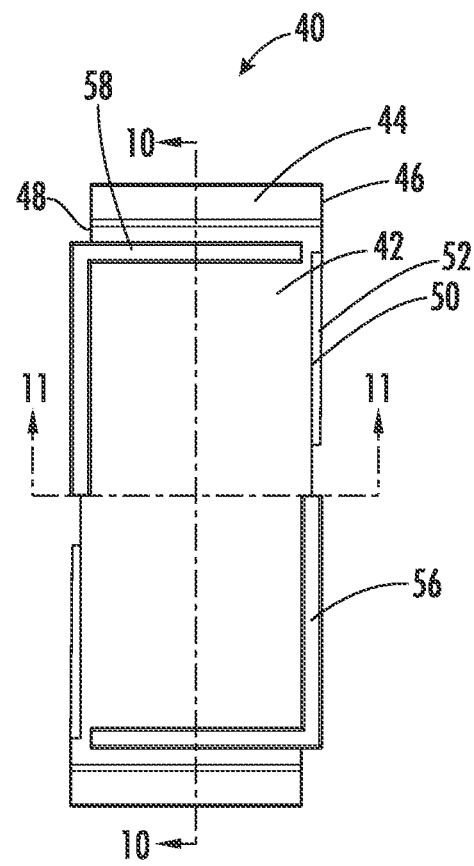
FIG. 7 is a front elevation view of the wall plate portion of FIG. 6.
Figure 8:
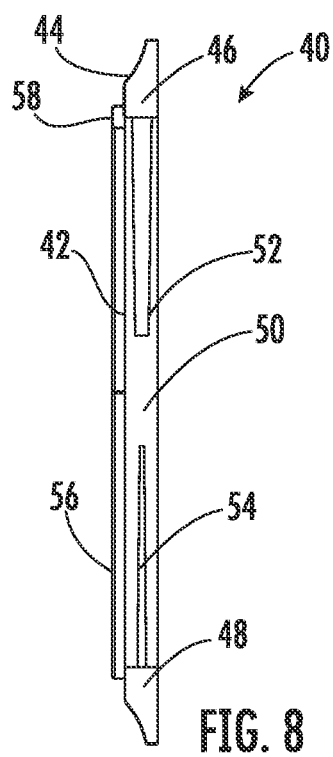
FIG. 8 is a right side elevation view of the wall plate portion of FIG. 6.

Each of the wall plate portions 32, 34, 36 include a common width and are assembled together by sliding along the edges as illustrated in FIGS. 4 and 5. A pair of end plate portions 38 enclose lateral ends of the wall plate assembly 30. The wall plate portions 32, 34, 36, 38 are each interchangeable to permit an end user to arrange and assemble a customized wall plate assembly 30 for any number and combination of electrical devices. The wall plate assembly 30 provides a unitary appearance once assembled with any number of intermediate wall plate portions 32, 34, 36 between a pair of end plate portions 38.

FIGS. 6-12 illustrate a wall plate portion 40 as a blank for covering a portion of a wall box for one or more electrical devices. The blank wall plate portion 40 has features in common with the other intermediate wall plate portions 32, 34, 36. The blank wall plate portion 40 may be formed from polypropylene, or any suitable material. The blank wall plate portion 40 may be molded. The blank wall plate portion 40 includes a plate or a substrate 42 to cover the wall box and electrical device. The substrate 42 has a height to extend across the wall box. The substrate 42 has a width sized to match a spacing between electrical devices within the wall box. The substrate 42 may have a consistent thickness for a flat appearance, or variable to incorporate a surface finish or design.

The blank wall plate portion 40 is radially symmetrical about an axis into the wall with an increment of 180 degrees. Therefore, the blank wall plate portion 40 can be installed in either upright direction. The pair of exposed peripheral edges of the blank wall plate portion 40 are typically oriented at a top edge and a bottom edge of the blank wall plate portion 40. A rim 44 is provided along the exposed peripheral edges of the wall plate portion 40. The rims 44 extend rearward of the substrate 42 to engage the wall and to provide a decorative transition from the substrate 42 to the wall. The rims 44 have the same width as the substrate 42. The rims 44 are also offset laterally from the substrate 42 to provide an overhang 46 from the substrate 42 on one end, and a recess 48 on the other end. The overhang 46 of each rim 44 is received within the recess 48 of an adjacent wall plate portion 40 upon assembly.

The substrate 42 has a pair of lateral sides 50 for engagement with a lateral side 50 of an adjacent wall plate portion 32, 34, 36, 38, 40. A pair of fasteners 52, 54 are provided on each lateral side 50 to connect to the adjacent wall plate portion 32, 34, 36, 38, 40. The pair of fasteners 52, 54 are complementary and sized to fasten to a corresponding pair of fasteners 52, 54 on another lateral side 50 of the adjacent wall plate portion 32, 34, 36, 38, 40. The pair of fasteners 52, 54 are oriented to fasten to another pair of fasteners 52, 54 by sliding in a height direction of the substrates 42.

Figure 2:
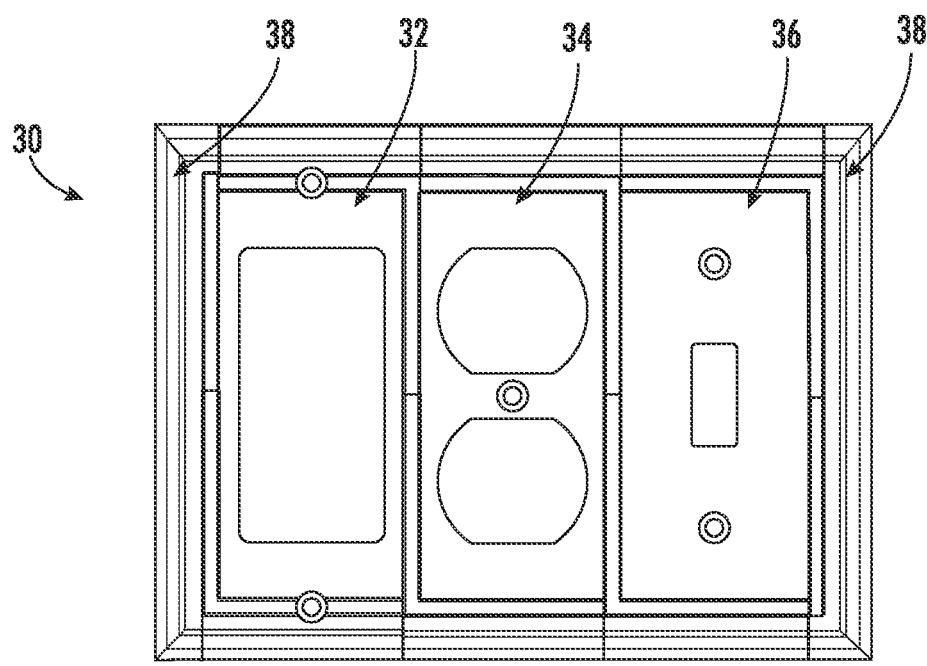
FIG. 2 is a front elevation view of the wall plate assembly of FIG. 1.
Figure 3:
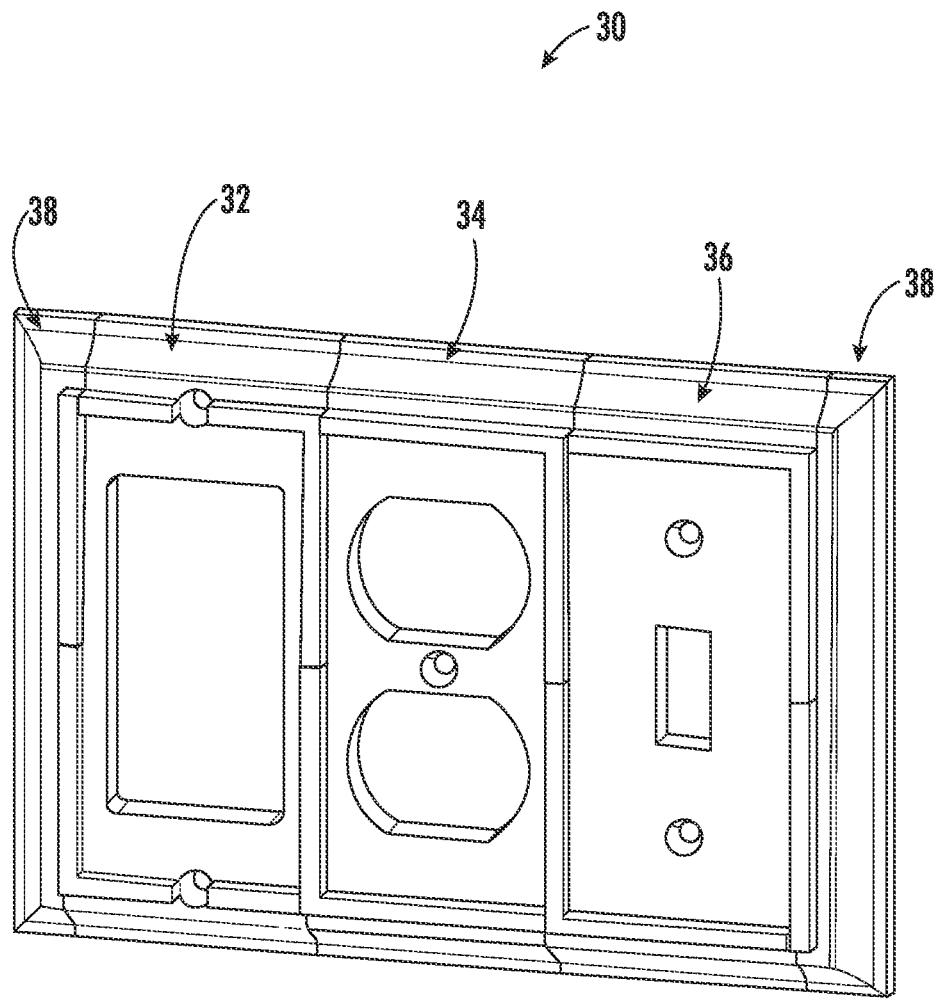
FIG. 3 is another front perspective view of the wall plate assembly of FIG. 1.

The first fastener 52 is illustrated as a tapered projection from the lateral side, often referred to as a dovetail 52. The second fastener 54 is a corresponding tapered groove 54 sized to receive the dovetail 52, and referred to as a dovetail groove 54. To assemble adjacent wall plate portions, such as the wall plate portions 32, 34, the wall plate portions 32, 34 are aligned as illustrated in FIGS. 4 and 5. In this orientation, the dovetail 52 of the wall plate portion 32 is aligned with the dovetail groove 54 of the wall plate portion 34. Likewise, the dovetail 52 of the wall plate portion 34 is aligned with the dovetail groove 54 of the wall plate portion 32. Then the wall plate portions 32, 34 are translated relative each other to fasten the dovetails 52 into the dovetail grooves 54. The wall plate portions 32, 34 are slid until the rim overhangs 46 engage the recesses 48, providing a limit to the translation and an abutment that provides uniform aligned appearance as illustrated in FIGS. 1-3.

Referring again to FIG. 8, the dovetail 52 and the groove 54 are reversible for each lateral side 50 so either lateral side 50 may be fastened to any lateral side 50 of the wall plate portions 32, 34, 36, 38, 40. Additionally, the dovetails 52 are tapered with a thickness that increases toward the overhang 46 to increase friction as the dovetails 52 are fastened into the grooves 54. The increased width of the dovetails 52 and the lengthwise assembly motion further converges adjacent substrates 42 together to eliminate a gap between adjacent lateral sides 50. The gap between adjacent lateral sides 50 is available in prior art designs with fasteners that attach in a direction perpendicular to the substrate 42, which detract from the ornamentality and safety of the prior art wall plates.

Referring again to FIGS. 6 and 7, each wall plate portion 40 may also include a pair of seam covers 56 extending partially along each lateral side 50 of the substrate 42. The seam covers 56 extend over the lateral side 50 to cover a seam between abutting lateral sides 50 once assembled. The seam covers 56 each extend along one half of the length the substrate 42 to abut against the corresponding seam cover 56 of the adjacent wall plate portion 32, 34, 36, 38, 40. The seam covers 56 collectively cover seams at the lateral sides 50 of the substrates 42, while also providing an ornamental architectural appearance upon the wall plate assembly 30.

The wall plate portion 40 may also include an ornamental, architectural cross member 58 that extends across an intersection of the substrate 42 and each rim 44 to interconnect the seam covers 56 and provide a unitary ornamental appearance across the wall plate assembly 30.

Figure 9:
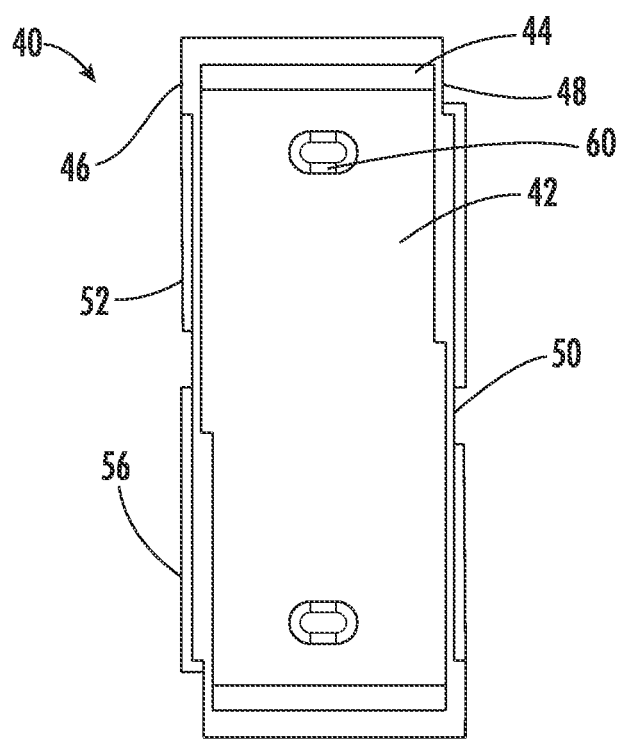
FIG. 9 is a rear elevation view of the wall plate portion of FIG. 6.
Figure 10:
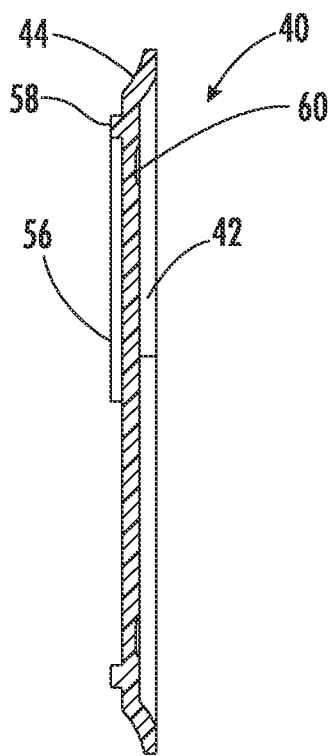
FIG. 10 is a right side section view of the wall plate portion taken along section line 10-10 in FIG. 7.
Figure 11:
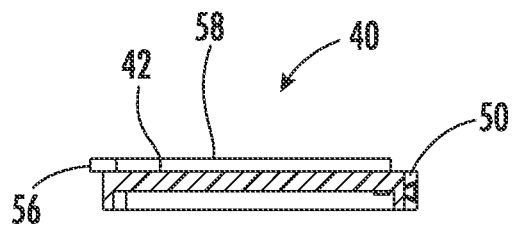
FIG. 11 is a bottom section view of the wall plate portion taken along section line 11-11 in FIG. 7.
Figure 12:
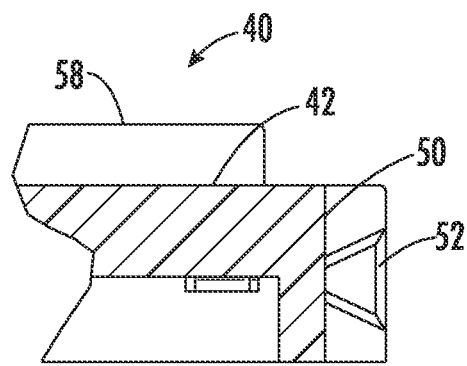
FIG. 12 is an enlarged partial bottom section view of the wall plate portion of FIG. 11.

With reference now to FIGS. 9 and 10, a pair of depressions 60 may each be formed within a rear surface of the substrate 42 to provide additional clearance to fastener heads of the electrical device within the wall box.

Figure 13:
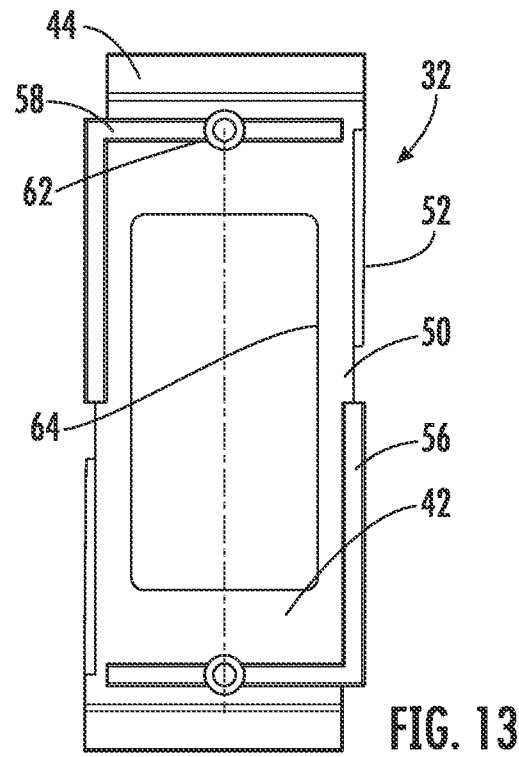
FIG. 13 is a front elevation view of a wall plate portion according to another embodiment.

The rocker wall plate portion 32 is illustrated disassembled from the wall plate assembly 30 in FIG. 13. The rocker wall plate portion 32 includes all of the features discussed above with reference to the blank wall plate portion 40. The rocker wall plate portion 32 also includes a pair of fastener apertures 62 to attach the rocker wall plate portion 32 to the electrical device. Additionally, the rocker wall plate portion 32 includes a switch aperture 64 to receive a rocker switch or the like, from the electrical device.

Figure 14:
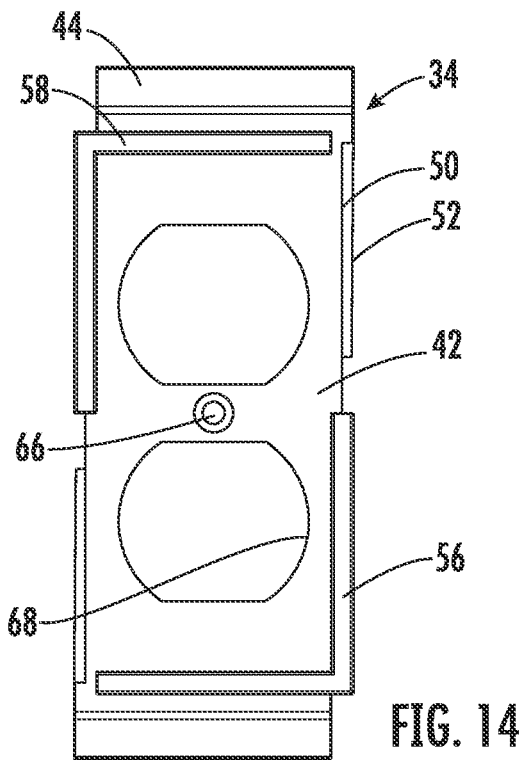
FIG. 14 is a front elevation view of a wall plate portion according to another embodiment.

The outlet wall plate portion 34 is illustrated disassembled from the wall plate assembly 30 in FIG. 14. The outlet wall plate portion 34 also includes all of the of the blank wall plate portion 40. The outlet wall plate portion 34 also includes a fastener aperture 66 to attach the outlet wall plate portion 34 to the electrical device. The outlet wall plate portion 34 also includes a pair of duplex apertures 68 to receive a pair of duplex outlets from the electrical device.

Figure 15:
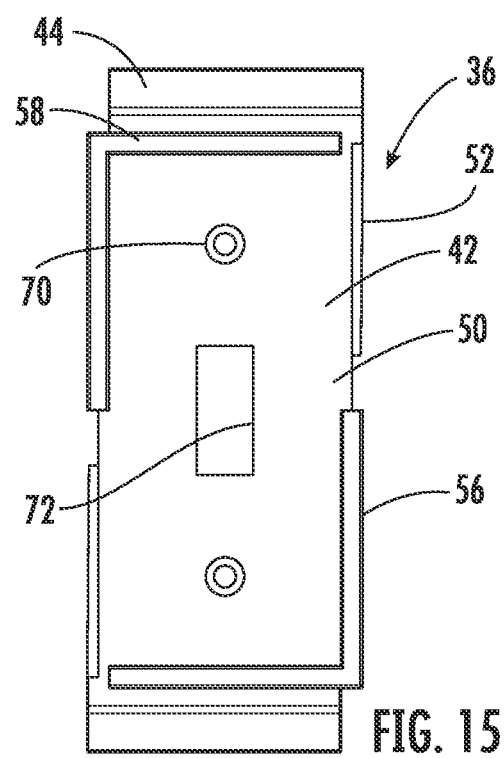
FIG. 15 is a front elevation view of a wall plate portion according to another embodiment.
Figure 20:
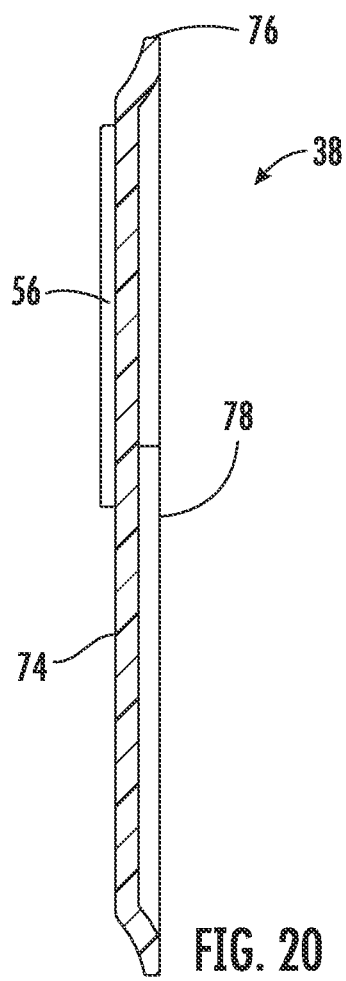
FIG. 20 is a right side section view of the wall plate portion taken along section line 20-20 in FIG. 17.
Figure 21:
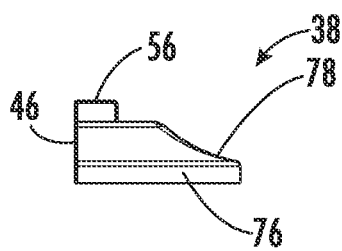
FIG. 21 is bottom end view of the wall plate portion of FIG. 16.
Figure 22:
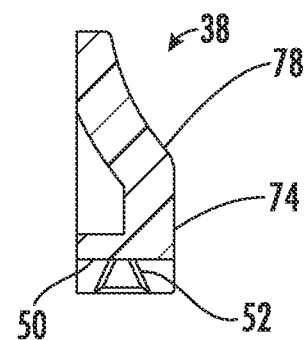
FIG. 22 is an enlarged top section view of the wall plate portion taken along section line 22-22 in FIG. 18.

The toggle wall plate portion 36 is illustrated disassembled from the wall plate assembly 30 in FIG. 15. The toggle wall plate portion 36 includes the features of the blank wall plate portion 40. The toggle wall plate portion 36 also includes a pair of fastener apertures 70 to attach the toggle wall plate portion 36 to the electrical device. Additionally, the toggle wall plate portion 36 includes a switch aperture 72 to receive a toggle switch from the electrical device.

FIGS. 16-22 illustrate the end plate portion 38 disassembled from the wall plate assembly 30. The end plate portion 38 has features in common with the intermediate wall plate portions 32, 34, 36, 40. The end plate portion 38 cooperates with the intermediate wall plate portions 32, 34, 36, 40 to cover the wall box and electrical device. The end plate portion 38 has a height to extend across the wall box.

The end plate portion 38 can be installed in either upright direction to be installed to either lateral side of the intermediate wall plate portions 32, 34, 36, 40. The end plate portion 38 has as substrate 74 to align with the substrate 42 of an adjacent intermediate wall plate portions 32, 34, 36, 40. The end plate portion 38 also includes one inboard lateral side 50 for engagement with the lateral side 50 of the adjacent intermediate wall plate portion 32, 34, 36, 40. A pair of fasteners 52, 54, which are the dovetail 52 and the dovetail groove 54, are provided on the lateral side 50 to connect to the adjacent intermediate wall plate portion 32, 34, 36, 40. To assemble the end plate portion 38, such as to the wall plate portions 32, 36, the end plate portions 38 are aligned as illustrated in FIGS. 4 and 5. In this orientation, the dovetail 52 of the end plate portions 38 are aligned with the dovetail grooves 54 of the wall plate portions 32, 36. Likewise, the dovetails 52 of the wall plate portions 32, 36 are aligned with the dovetail grooves 54 of the end plate portions 38. Then, the end plate portions 38 are translated relative to the wall plate portions 32, 36 to fasten the dovetails 52 into the dovetail grooves 54 as illustrated in FIGS. 1-3.

The end plate portion 38 includes a pair of rims 76 extending from the substrate 74 and the lateral side 50 to align with the adjacent rims 44 of the intermediate wall plate portions 32, 34, 36, 40. The rims 76 are also offset laterally from the substrate 74 to provide an overhang 46 from the substrate 74 on one end, and a recess 48 on the other end. The overhang 46 of each rim 76 is received within the recess 48 of an adjacent wall plate portion 32, 34, 36, 40 upon assembly. The recess 48 of each rim 76 receives the overhang 46 of the adjacent wall plate portion 32, 34, 36, 40. The end plate portion 38 also includes an outboard rim 78 extending a length of the substrate 74 to interconnect the top and bottom rims 76. The rims 76, 78 extend around the periphery of the lateral side 50 to extend to the wall to enclose and at least partially conceal the electrical device or devices within the wall box. During assembly, the end plate portions 38 are slid until the rim overhangs 46 engage the recesses 48, providing a limit to the translation and an abutment that provides uniform aligned appearance.

Each end plate portion 38 may also include a seam cover 56 extending partially along the lateral side 50 of the substrate 74. The seam cover 56 extends over the lateral side 50 to cover a seam between abutting lateral sides 50 once assembled. The seam cover 56 extends along one half of the length the substrate 74 to abut against the corresponding seam cover 56 of the adjacent wall plate portion 32, 34, 36, 40. The seam covers 56 collectively cover seams at the lateral sides 50 of the substrates 42, 74 while also providing an ornamental architectural appearance upon the wall plate assembly 30.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wall plate assembly comprising:
   a first wall plate portion to at least partially cover an electrical device, with a first lateral side with a first fastener and a second fastener formed partially along the first lateral side; and
   a second wall plate portion to at least partially cover the electrical device, with a first lateral side with a first fastener formed partially along the first lateral side and sized to fasten by translation in a length direction with the first wall plate portion second fastener, and a second fastener formed partially along the first lateral side and sized to fasten by translation in the length direction with the first wall plate portion first fastener.

2. The wall plate assembly of claim 1, wherein the first wall plate portion and the second wall plate portion have a common width in a lateral direction.

3. The wall plate assembly of claim 1, wherein the first wall plate portion and the second wall plate portion each comprises a substrate with a pair of lateral sides, the pair of lateral sides further defining the first lateral side and a second lateral side.

4. The wall plate assembly of claim 3, wherein each wall plate portion further comprises a pair of rims, each extending along longitudinal edges of the substrate and away from the substrate to engage an upright support surface and to provide a decorative transition from the substrate to the upright support surface.

5. The wall plate assembly of claim 4, wherein the pair of rims each have a width that is common with a width of the substrate; and
   wherein the pair of rims are each offset laterally from the substrate in opposed directions to provide an overhang from the substrate at one end of each lateral side and to provide a recess at another end of each lateral side.

6. The wall plate assembly of claim 5, wherein the rim overhang provides a limit to translation in the length direction of the first wall plate portion relative to the second wall plate portion.

7. The wall plate assembly of claim 3, wherein at least one of the first wall plate portion and the second wall plate portion is radially symmetrical about an axis perpendicular to the substrate with an increment of 180 degrees so that the at least one wall plate portion is interchangeable to be installed in either upright direction.

8. The wall plate assembly of claim 3, wherein the second lateral side of each substrate further comprises a first fastener and a second fastener formed partially along the second lateral side.

9. The wall plate assembly of claim 8, wherein the first fastener of the second lateral side of each substrate is sized to fasten by translation in a length direction with the second fastener of first lateral side of each substrate.

10. The wall plate assembly of claim 9, wherein the first fastener is a tapered projection or a tapered groove; and
    wherein the second fastener is the other of the tapered projection or the tapered groove.

11. The wall plate assembly of claim 9, further comprising an end plate portion with a first fastener and a second fastener to attach to the first lateral side or the second lateral side of each substrate by translation in the length direction.

12. The wall plate assembly of claim 11, wherein the end plate portion is interchangeable to be installed to the first wall plate portion or the second wall plate portion in either upright direction to be installed to either lateral side of the first and second wall plate portions.

13. The wall plate assembly of claim 11, wherein each wall plate portion further comprises a pair of rims, each extending along longitudinal edges of the substrate and away from the substrate to engage an upright support surface and to provide a decorative transition from the substrate to the upright support surface; and
    wherein the end plate portion further comprises an outboard rim extending a length of the substrate to interconnect the pair of rims of an adjacent wall plate portion.

14. The wall plate assembly of claim 1, further comprising:
    a first seam cover extending partially over the first lateral side of the first wall plate portion; and
    a second seam cover extending partially over the first lateral side of the second wall plate portion such that when the first wall plate portion is fastened to the second wall plate portion, the first seam cover and the second seam cover collectively cover a seam between the first lateral side of the first wall plate portion and the first lateral side of the second wall plate portion.

15. A wall plate assembly comprising:
    a first wall plate portion to at least partially cover an electrical device, with a first lateral side with a first fastener formed therealong, and a first seam cover extending partially over the first lateral side; and
    a second wall plate portion to at least partially cover another electric device, with a first lateral side with a first fastener formed therealong and sized to fasten with the first fastener of the first wall plate portion, and a second seam cover extending partially over the first lateral side such that when the first wall plate portion is fastened to the second wall plate portion, the first seam cover and the second seam cover collectively cover a seam between the first lateral side of the first wall plate portion and the first lateral side of the second wall plate portion.

16. The wall plate assembly of claim 15, further comprising:
   a second fastener formed along the first lateral side of the first wall plate portion; and
   a second fastener formed along the first lateral side of the second wall plate portion, sized to fasten with the second fastener of the first wall plate portion.

17. A wall plate assembly comprising:
   a first wall plate portion to at least partially cover an electrical device, with a substrate with a first lateral side with a first fastener and a second fastener formed partially along the first lateral side;
   a first end plate portion with a first fastener sized to fasten by translation along the first lateral side in a length direction with the second fastener of the first wall plate portion, and a second fastener sized to fasten by the translation along the first lateral side in the length direction with the first fastener of the first wall plate portion.

18. The wall plate assembly of claim 17, wherein the substrate defines a second lateral side, wherein the second lateral side of the substrate further comprises a first fastener and a second fastener formed partially along the second lateral side; and
   a second end plate portion with a first fastener sized to fasten by translation in the length direction with the second fastener of the second lateral side of the first wall plate portion, and a second fastener sized to fasten by translation in the length direction with the first fastener of the second lateral side of the first wall plate portion.

19. A wall plate assembly comprising:
   a first wall plate portion to at least partially cover an electrical device, with a first lateral side with a first fastener and a second fastener formed partially along the first lateral side;
   a second wall plate portion to at least partially cover the electrical device, with a first lateral side with a first fastener formed partially along the first lateral side and sized to fasten in a length direction with the first wall plate portion second fastener, and a second fastener formed partially along the first lateral side and sized to fasten in the length direction with the first wall plate portion first fastener;
   a first seam cover extending partially over the first lateral side of the first wall plate portion; and
   a second seam cover extending partially over the first lateral side of the second wall plate portion such that when the first wall plate portion is fastened to the second wall plate portion, the first seam cover and the second seam cover collectively cover a seam between the first lateral side of the first wall plate portion and the first lateral side of the second wall plate portion.

20. The wall plate assembly of claim 19, wherein each seam cover extends along one half of a length of each wall plate portion to abut against a corresponding seam cover of an adjacent wall plate portion.

21. The wall plate assembly of claim 19, wherein the first wall plate portion and the second wall plate portion each further comprises:
   a substrate with a pair of lateral sides, the pair of lateral sides further defining the first lateral side and a second lateral side;
   a pair of rims, each extending along longitudinal edges of the substrate and away from the substrate to engage an upright support surface and to provide a decorative transition from the substrate to the upright support surface; and
   a cross member extending across an intersection of the substrate and each rim to interconnect the first and second seam covers and provide a unitary ornamental appearance across the wall plate assembly.

22. The wall plate assembly of claim 3, wherein a pair of depressions are formed in a rear surface of the substrate of one of the first wall plate portion and the second wall plate portion to provide clearance to fastener heads of the electrical device.

* * * * *